(12) United States Patent
Busardo et al.

(10) Patent No.: US 9,988,305 B2
(45) Date of Patent: Jun. 5, 2018

(54) PROCESS FOR TREATMENT BY A BEAM OF MONO- OR MULTICHARGED IONS OF A GAS TO PRODUCE ANTIREFLECTIVE GLASS MATERIALS

(71) Applicant: QUERTECH, Caen (FR)

(72) Inventors: Denis Busardo, Gonneville-sur-Mer (FR); Frederic Guernalec, Liffre (FR)

(73) Assignee: IONICS FRANCE, Hérouville-Saint-Clair (FR)

( * ) Notice: Subject to any disclaimer, the term of this patent is extended or adjusted under 35 U.S.C. 154(b) by 254 days.

(21) Appl. No.: 14/768,177

(22) PCT Filed: Feb. 12, 2014

(86) PCT No.: PCT/FR2014/050272
§ 371 (c)(1),
(2) Date: Aug. 14, 2015

(87) PCT Pub. No.: WO2014/125211
PCT Pub. Date: Aug. 21, 2014

(65) Prior Publication Data
US 2015/0376058 A1    Dec. 31, 2015

(30) Foreign Application Priority Data
Feb. 15, 2013  (FR) ..................................... 13 00336

(51) Int. Cl.
*C03C 23/00*     (2006.01)
(52) U.S. Cl.
CPC ................. *C03C 23/0055* (2013.01)
(58) Field of Classification Search
CPC .............................................. C03C 23/0055
See application file for complete search history.

(56) References Cited

U.S. PATENT DOCUMENTS

| 5,250,098 A |   | 10/1993 | Platts |
|---|---|---|---|
| 5,342,690 A | * | 8/1994 | Platts .................. C03C 23/0055 |
|  |  |  | 428/336 |

(Continued)

FOREIGN PATENT DOCUMENTS

| DE | 214369 A1 | 10/1984 |
|---|---|---|
| FR | 2334278 A7 | 7/1977 |

(Continued)

OTHER PUBLICATIONS

Battaglin et al., "Ion implantation effects in heavy metal fluoride glasses," Journal of Non-Crystalline Solids, North-Holland Physics Publishing, Amsterdam, NL, vol. 120, No. 1-3, pp. 256-261, Apr. 1, 1990.

(Continued)

*Primary Examiner* — David Sample
(74) *Attorney, Agent, or Firm* — Marshall, Gerstein & Borun LLP

(57) ABSTRACT

A method of treatment using a beam of singly- and multiply-charged gas ions produced by an electron cyclotron resonance (ECR) source of a glass material in which—the ion acceleration voltage of between 5 kV and 1000 kV is chosen to create an implanted layer of a thickness equal to a multiple of 100 nm; —the ion dose per surface unit in a range of between 1012 ions/cm2 and 1018 ions/cm2 is chosen so as to create an atomic concentration of ions equal to 10% with a level of uncertainty of (+/−)5%. Advantageously this makes it possible to obtain materials made from glass that is non-reflective in the visible range.

11 Claims, 9 Drawing Sheets

(56) References Cited

U.S. PATENT DOCUMENTS

| | | | |
|---|---|---|---|
| 5,965,629 A | 10/1999 | Jung et al. | |
| 2006/0210783 A1* | 9/2006 | Seder | C03C 17/225 428/212 |
| 2013/0149459 A1* | 6/2013 | Bruna | B65D 81/24 427/523 |
| 2013/0171334 A1* | 7/2013 | Bruna | A61F 9/00 427/2.14 |
| 2015/0299846 A1* | 10/2015 | Bruna | A61L 2/14 427/2.3 |

FOREIGN PATENT DOCUMENTS

| | | |
|---|---|---|
| FR | 2962135 A1 | 1/2012 |
| WO | WO-2012/001325 A2 | 1/2012 |

OTHER PUBLICATIONS

Geotti-Bianchini et al., "Antireflective effects on a soda-lime glass induced by AR+ implantation," Journal of the American Ceramic Society, Blackwell Publishing, Malden, MA, vol. 67, No. 1, pp. 39-42, Jan. 1, 1984.

Mazzoldi, Paolo, "Properties of Ion Implanted Glasses," Nuclear Instruments & Methods in Physics Research, North-Holland Publishing Company, Amsterdam, NL, vol. 209/210, Part 02, pp. 1343-1354, May 1, 1983.

Mazzoldi et al., "Ion beam modification of glass surface properties," Journal of Non-Crystalline Solids, North-Holland Physics Publishing, Amsterdam, NL. vol. 120, No. 1-3, pp. 223-233, Apr. 1, 1990.

Polato et al., "Characterization by nuclear and spectrophotometric analysis of near-surface modifications of glass implanted with heavy ions," Journal of the American Ceramic Society, Blackwell Publishing, Malden, MA, vol. 70, No. 10, pp. 775-779, Oct. 1, 1987.

Webb et al., "Refractive index profiles induced by ion implantation into silica," Journal of Physics D. Applied Physics, IOP Publishing, Bristol, United Kingdom, vol. 9, No. 9, pp. 1343-1354, Jan. 1, 1976.

Search Report for PCT/FR2014/050272, dated Sep. 1, 2014.

Written Opinion for PCT/FR2014/050272, dated Sep. 1, 2014.

Search Report for FR 1300336, dated Jan. 23, 2014.

* cited by examiner

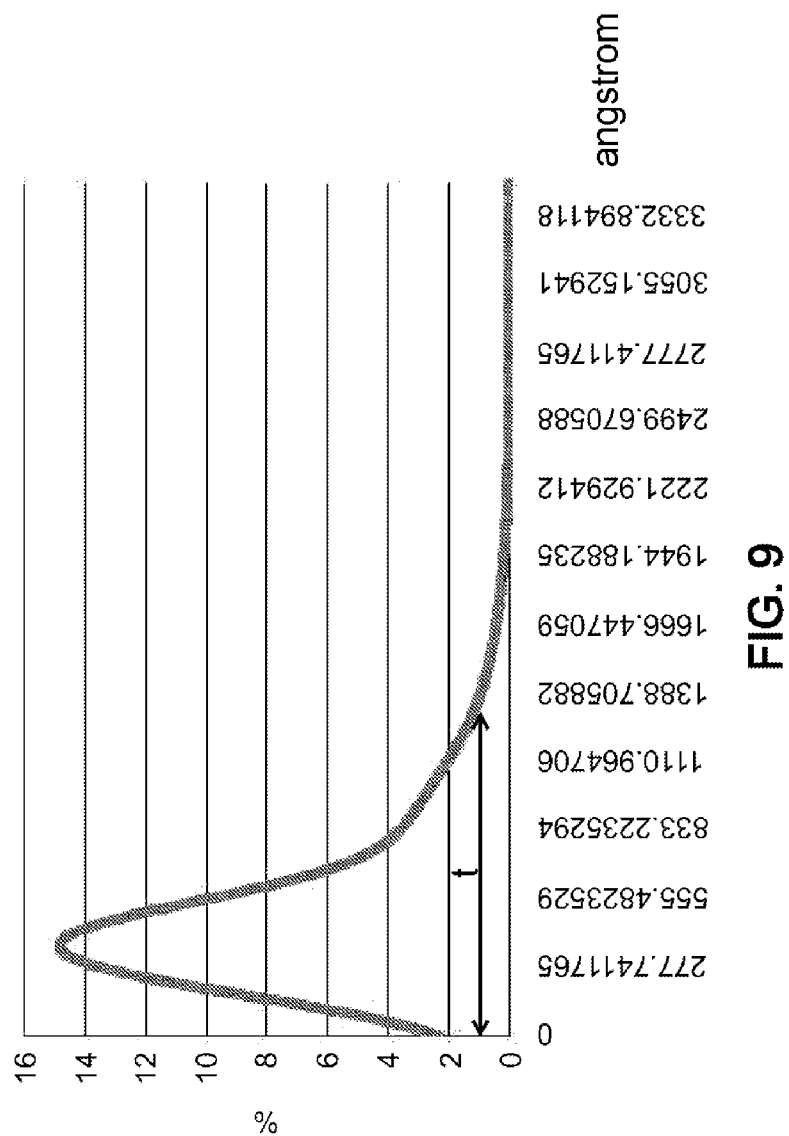

PROCESS FOR TREATMENT BY A BEAM OF MONO- OR MULTICHARGED IONS OF A GAS TO PRODUCE ANTIREFLECTIVE GLASS MATERIALS

FIELD OF THE INVENTION

A subject matter of the invention is a process for the treatment of a glass material by a beam of mono- and multicharged ions of a gas; this process is targeted at reducing the reflection and at improving the transmission of light in the spectrum of the wavelengths of the visible region over a long period of time. The process of the invention applies in particular to the surface of a transparent substrate of a lens or a sheet glass so that said surface acquires antireflective properties characterized by a transmission of visible light of greater than 98%. Under these conditions, the surface exhibits good antireflective properties in the visible region.

BACKGROUND OF THE INVENTION

It is well known that a glass surface reflects approximately 95.5% of the incident light, reducing in fact the energy efficiency of a photovoltaic cell or making it difficult to read a computer or cell phone flat screen.

This reflection of light on a glass surface is explained more generally by the Fresnel relationships which give, for a light ray passing through a diopter under an angle of incidence of 90°, the following reflection (R) and transmission (T) coefficients:

$$R=((n2-n1)/(n2+n1))^2; \quad T=4n1*n2/(n2+n1)^2$$

where n1 and n2 are the reflective indices of the media separated by the diopter.

It is found that R+T=1 (conservation of energy).

For air (n1=1) and glass (n2=1.54), these formulae produce R=0.045 and T=1-R=0.955 (only 4.5% is reflected whereas 95.5% is transmitted).

For a glass strip composed of two faces, there exists a loss which is two times greater, 2×4.5%=9%. This loss of light energy represents a not insignificant portion for a photovoltaic application.

There exist antireflective processes consisting of depositions based on metal oxide, the use of which is relatively complex and expensive. For example, for lenses, mention will be made of the process which consists in depositing, under vacuum ($10^{-5}$ torr), thin layers of metal oxides with an accuracy of the order of an angstrom. In dust-free chambers, the lenses are first cleaned in washing lines and then dried under ultrasound. They are fitted into supports which will enter treatment chambers. Vacuum is applied in the chambers in order to obtain the evaporation (sublimation) of the oxide at lower temperature. The evaporation can be carried out by the Joule effect by heating the oxide or using an electron gun. It is necessary to perfectly control the quality and the measurement of the vacuum, the evaporation rate and the thicknesses of layers deposited. These thicknesses should, of course, be uniform. There exist other types of less expensive PVD depositions, such as magnesium fluoride $MgF_2$ (index 1.38) and cryolite $Na_3AlF_6$ (index 1.35), the refractive indices of which approach the ideal index without, however, reaching it, as may be made possible by the process of the invention.

"Glass" is understood a mean a hard material or alloy which is fragile (brittle) and transparent to visible light. Generally, glass is composed of silicon oxide (silica $SiO_2$) and fluxes, the main constituent of the being sand. Among all the types of glass, the commonest is soda-lime glass. From the physical viewpoint, glass is an amorphous material (that is to say, noncrystalline material) exhibiting the phenomenon of glass transition. Below its transition temperature, which can be very high, glass exists in the glassy state.

This results in a need for a method for the surface treatment of glass materials in order to introduce antireflective properties over a very long period of time, preferably according to methods which can be easily operated on an industrial scale, so as to be able to offer such glass materials in a significant amount and at reasonable costs.

The document U.S. Pat. No. 5,250,098 discloses a process for the durable antireflective treatment in the visible region of a glass material consisting of a bombardment by an ion beam; the ions used are monocharged.

SUMMARY OF THE INVENTION

It is an aim of the invention to offer a method for the treatment of glass material which is relatively inexpensive and which makes it possible to treat surfaces corresponding to the requirements of numerous applications. Mention will be made, among these applications, of: touch screens, spectacle lenses, the lenses of an optical device, the windows of a building or optical fibers.

The invention thus provides a process for the durable antireflective treatment in the visible region of a glass material which consists of a bombardment by a beam of mono- and multicharged ions of a gas which are produced by an electron cyclotron resonance (ECR) source where:
  the temperature for treatment of the glass material is less than or equal to the glass transition temperature;
  the dose of mono- and multicharged ions of a gas which are implanted per unit of surface area is chosen within a range of between $10^{12}$ ions/cm$^2$ and $10^{18}$ ions/cm$^2$ so as to obtain an atomic concentration of mono- and multicharged ions of a gas such that the refractive index n of the implanted layer is approximately equal to $(n1*n2)^{1/2}$, where n1 is the index of the air and n2 is the index of the glass;
  the acceleration voltage is chosen within a range of between 5 kV and 1000 kV so as to obtain an implanted thickness t equal to p*λ/4*n, where t is the implanted thickness corresponding to a region of implantation where the atomic concentration of implanted mono- and multicharged ions of a gas is greater than or equal to 1%, p is an integer, λ is the incident wavelength and n is the index of the implanted layer.

The inventors have been able to find that a process for durable antireflective treatment in the visible region comprising a bombardment by a beam of mono- and multicharged ions of a gas produced by an electron cyclotron resonance (ECR) source is more effective than a process comprising a bombardment by a beam of monocharged ions of a gas.

According to one embodiment, the beam of mono- and multicharged ions of a gas comprises 10% of multicharged ions or more than 10% of multicharged ions.

According to one embodiment, the mono- and multicharged ions of a gas of the ion beam are selected from the ions of the elements of the list of the "noble" gases consisting of helium (He), neon (Ne), argon (Ar), krypton (Kr) and xenon (Xe).

According to another embodiment, the mono- and multicharged ions of a gas of the ion beam are selected from the ions of the gases of the list consisting of nitrogen ($N_2$) and oxygen ($O_2$).

The dose of mono- and multicharged ions of a gas which are implanted per unit of surface area is chosen within a range of between $10^{12}$ ions/cm$^2$ and $10^{18}$ ions/cm$^2$ so as to obtain an atomic concentration of mono- and multicharged ions of a gas such that the refractive index n of the implanted layer is approximately equal to $(n1*n2)^{1/2}$, where n1 is the index of the air and n2 is the index of the glass; a decrease is obtained in the refractive index of the implanted layer towards a value substantially equal to the square root of the product of the indices of the media separated by the diopter. This is reflected by the following formula: $n=(n1*n2)^{1/2}$, where n1 is the index of the air (n1=1) and n2 is the index of the glass; in the case of a soda-lime glass (n2=1.54), the index (n) of the implanted layer has to be substantially equal to 1.24.

According to their calculations, the inventors estimate that there should exist a proportional relationship between the atomic concentration of implanted ions and the decrease in the optical index observed. This relationship would then be approximately as follows:

$$N=n1*x1+n2*x2 \text{ with } x1+x2=1$$

with x1 corresponding to the mean atomic concentration of silicon (which represents the great majority of the atoms constituting glass) in the implanted layer;

with x2 corresponding to the mean atomic concentration of the ions present in the implanted layer.

This also amounts to writing:

$$N=n1+(n2-n1)*x2.$$

In order to approach an index n=1.24, it would be necessary, on the basis of this formula, to implant approximately 50% of ions (x2=0.5).

The experimental results of the inventors demonstrate that 5 times fewer ions are necessary in order to obtain the result, i.e. approximately an atomic concentration of ions of 10%.

This amounts to writing the following empirical formula:

$$N=n1+(n2-n1)*5*x2.$$

Without going too far, this difference between theory and experiment might be explained by the creation and the agglomeration of gaps which would be additional to the formation of nanocavities filled with gas, reducing the density of the medium and enhancing in fact the decrease in the refractive index.

According to one embodiment, the process of the invention recommends achieving a maximum atomic concentration of approximately 10% of gas in order to obtain a refractive index (n) very close to $(n1*n2)^{1/2}$.

The acceleration voltage of the mono- and multicharged ions of a gas is thus chosen within a range of between 5 kV (kilovolts) and 1000 kV (kilovolts) so as to obtain an implanted thickness corresponding to a whole multiple of the incident wavelength divided by 4 times the refractive index of the implanted layer. In all which follows, implanted thickness refers to the region of implantation where the atomic concentration of ions is greater than or equal to 1%.

This is reflected by the following formula:

$t=p*\lambda/4*n$, where t is the implanted thickness, p is an integer, $\lambda$ is the incident wavelength and n is the index of the implanted layer (equal to $(n1*n2)^{1/2}$).

For a yellow monochromatic wave which is representative of the visible region (wavelength equal to 560 nm), the implanted thickness has to be approximately equal to $p*(560/4*1.24)$, where p is an integer, in other words to $p*100$ nm. For p=1, the implanted thickness is equal to 100 nm and, for p=2, the implanted thickness is equal to 200 nm.

The treatment recommended by the process of the invention results in a reduction of at least 50% in the reflection coefficient, indeed even at least 90%, of the incident wave. This is because, by adopting the conditions of the process of the invention where n1=1 (air) and $n=(n2)^{1/2}$ and by calculating the minimum reflection coefficient $R_m$ with the following formula $R_m=(n^2-n2)^2/(n^2+n2)^2$, it may be expected, by adjusting the parameters, that $R_m$ will tend instead towards the ideal value of 0, in other words no reflection.

By way of comparison, a deposited layer of magnesium fluoride ($MgF_2$) has an index of 1.35 (slightly greater than 1.24). An antireflective treatment by deposition of $MgF_2$ lowers the reflection coefficient from 4% to 1.2%, i.e. a reduction in the reflection coefficient of 60%.

According to one embodiment, the glass material is treated with mono- and multicharged ions of a gas, known as heavy "noble" ions, belonging to the list of the elements consisting of helium (He), neon (Ne), argon (Ar), krypton (Kr) and xenon (Xe). The purpose of this treatment is to create a region where the mono- and multicharged noble ions of a gas have the effect of creating a decrease in the density of the glass. This layer is characterized by a lower refractive index than that of the underlying healthy glass.

The choice of the mono- and multicharged ions of a gas and of the conditions for bombarding with these mono- and multicharged ions of a gas according to the invention makes it possible to advantageously obtain a decrease in the refractive index of the glass material which is expressed by a reduction in the reflection coefficient and an increase in the transmission coefficient. These properties are very important for enhancing, for example, the performance of a photovoltaic cell or for reducing the reflections on a flat touch screen.

The inventors have been able to find that the ranges chosen according to the invention for acceleration voltage and for dose of mono- and multicharged ions of a gas per unit of surface area make it possible to select experimental conditions where the reduction in the reflections (thus in the reflection coefficient) is possible by virtue of an ionic bombardment of mono- and multicharged ions of a gas.

In addition, they have been able to find that the process according to the invention can be carried out "cold", in particular at ambient temperature, and that it is advisable for the temperature of the glass material to remain less than or equal to the transition value of the glass material during the implementation of the process. It is thus possible to advantageously prevent the glass material from undergoing, in its body, a crystallographic modification harmful to its mechanical properties.

The choice of the dose of mono- and multicharged ions of a gas per unit of surface area within the dose range according to the invention can result from a prior calibration stage where a sample consisting of the glass material envisaged is bombarded with one of the mono- and multicharged ions of a gas, for example from He, Ne, Ar, Kr, Xe, $N_2$, or $O_2$. The bombarding of this glass material can be carried out in various regions of the material with a plurality of doses of mono- and multicharged ions of a gas, within the range according to the invention. The treated regions are subsequently observed so as to choose an appropriate dose as a function of the more or less significant observation of reflections on the treated surface.

The treated regions can thus be observed by simple observation techniques, such as observation with the naked eye under an angle of incidence of 10° of reflected light (for example neon tube), or more complex techniques, such as interferometry.

Without wishing to be committed to any one scientific theory, it may be thought that this phenomenon of reduction in the refractive index of the implanted thickness can be explained by the appearance of "nanocavities" filled with the implanted gases, the refractive index of which is very close to 1. This is because these mono- and multicharged ions of a gas are chemically inert and are dissolved in the glass below a certain atomic concentration threshold (which is estimated below 1%). As soon as this concentration threshold is exceeded, nanocavities filled with gas are formed, contributing to the lowering of the index of the implanted layer.

According to different embodiments, which may be combined:

the dose of mono- and multicharged ions of a gas per unit of surface area is greater than or equal to $10^{15}$ ions/cm$^2$, for example greater than or equal to $10^{16}$ ions/cm$^2$;

the acceleration voltage of the mono- and multicharged ions of a gas is between 5 kV and 200 kV;

the beam of mono- and multicharged ions of a gas comprises 10% of multicharged ions or more than 10% of multicharged ions;

the acceleration voltage is chosen in order to obtain an implanted thickness equal to p*100 nm, where p is an integer;

the dose of implanted mono- and multicharged ions of a gas per unit of surface area is chosen in order to achieve an atomic concentration of implanted ions equal to 10% with an uncertainty of (+/−) 5%; according to one embodiment, the choice of the dose of implanted mono- and multicharged ions of a gas per unit of surface area and the choice of the acceleration voltage are made by a calculation, carried out beforehand, which makes it possible to evaluate the dose of implanted mono- and multicharged ions of a gas per unit of surface area in order to achieve an atomic concentration of implanted ions equal to 10% with an uncertainty of (+/−) 5% starting from an implantation profile of the chosen ion as a function of the implantation depth;

the glass material is movable with respect to the beam of mono- and multicharged ions of a gas at a rate, $V_D$, of between 0.1 mm/s and 1000 mm/s; according to one embodiment, one and the same region of the glass material is moved under the beam of mono- and multicharged ions of a gas according to a plurality, N, of passes at the rate $V_D$.

According to the present invention, the mono- and multicharged ions of a gas are produced by an electron cyclotron resonance (ECR) source which has the advantage of being compact and sparing in energy.

The present invention is also targeted at a glass part comprising at least one surface with an implanted ion according to the treatment process, according to any one of the above embodiments, where the reflection of an incident wave in the visible region is reduced to less than half.

The present invention is also targeted at the use of the treatment process, according to any one of the above embodiments, to treat a bulk glass part chosen from the list consisting of a touch screen, a spectacle lens, a lens of an optical device, a window of a building and an optical fiber.

BRIEF DESCRIPTION OF THE DRAWINGS

Other distinguishing features and advantages of the present invention will emerge in the description below of non-limiting implementational examples, illustrated by the appended figures, where:

FIGS. 2, 3, 5, 7 and 9 represent implantation profiles of various ions as a function of the implantation depth;

DETAILED DESCRIPTION

According to examples of the implementation of the present invention, samples of soda-lime glass material have formed the subject of studies with mono- and multicharged helium ions for some samples, with mono- and multicharged argon ions for other samples and with mono- and multicharged ions of nitrogen $N_2$ for yet other samples.

These mono- and multicharged ions of a gas were emitted by an ECR source.

The family of the soda-lime glasses combines glasses based on silica $SiO_2$, on calcium and on sodium generally introduced in the manufacture in the form of CaO and $Na_2O$. These glasses are the most widespread; they are used for the manufacture of bottles and glazings and represent of the order of 90% of glass production.

The inventors have carried out a first series of tests with:

A beam of mono- and multicharged helium ions with an intensity of 1 mA comprising $He^+$ and $He^{2+}$ ions; the acceleration voltage is 35 kV; the $He^+$ energy is 35 keV and the $He^{2+}$ energy is 70 keV. The treatment doses are equal to $10^{16}$, $3\times10^{16}$ and $6\times10^{16}$ ions/cm$^2$.

A beam of mono- and multicharged argon ions with an intensity of 1 mA comprising $Ar^+$, $Ar^{2+}$ and $Ar^{3+}$ ions; the acceleration voltage is 35 kV; the $Ar^+$ energy is 35 keV, the $Ar^{2+}$ energy is 70 keV and the $Ar^{3+}$ energy is 105 keV. The treatment doses are equal to $10^{16}$, $5\times10^{16}$ and $10^{17}$ ions/cm$^2$.

The treated samples move with respect to the beam with a rate of movement of 120 mm/s and with a side advance at each return of 4 mm (10% of the diameter of the beam, which measures 40 mm). The treatment is carried out in several passes in order to achieve the necessary dose.

The antireflective properties of the surface of the samples can be assessed qualitatively with the naked eye by observing the reflection of an image on a glass surface or also quantitatively by virtue of the use of an interferometric measurement process: for example, monochromatic light of 560 nm is projected through a thin glass strip treated on both faces, under a given angle of incidence, and the image obtained, in the form of a series of nested rings in the focal plane of a lens, is analyzed. The reflection coefficient of the diopters of the strip can be deduced by measuring the fineness of the bright rings (at mid-height of the maximum intensity).

The inventors have carried out qualitative tests by observing, with the naked eye, the reflection of the light of a neon tube on a slightly inclined treated surface for different doses. The reflected image of this neon tube was observed under an angle of approximately 10°.

It emerges, from these qualitative tests, that the reflection of the neon in terms of lower contrast appears around a dose of $3\times10^{16}$ ions/cm$^2$ for argon and $10^{17}$ ions/cm$^2$ for helium.

Figure 2:
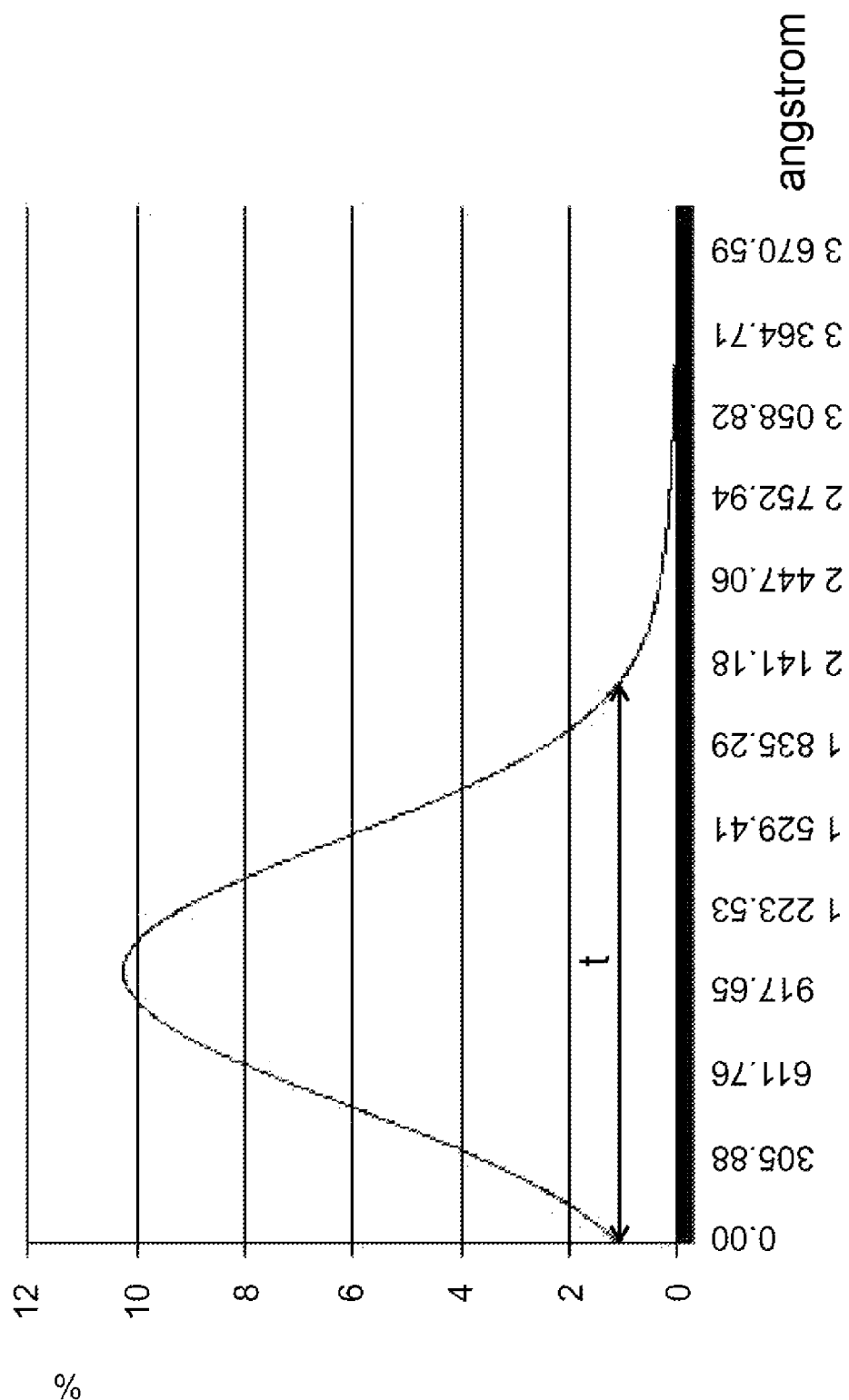
Figure 3:
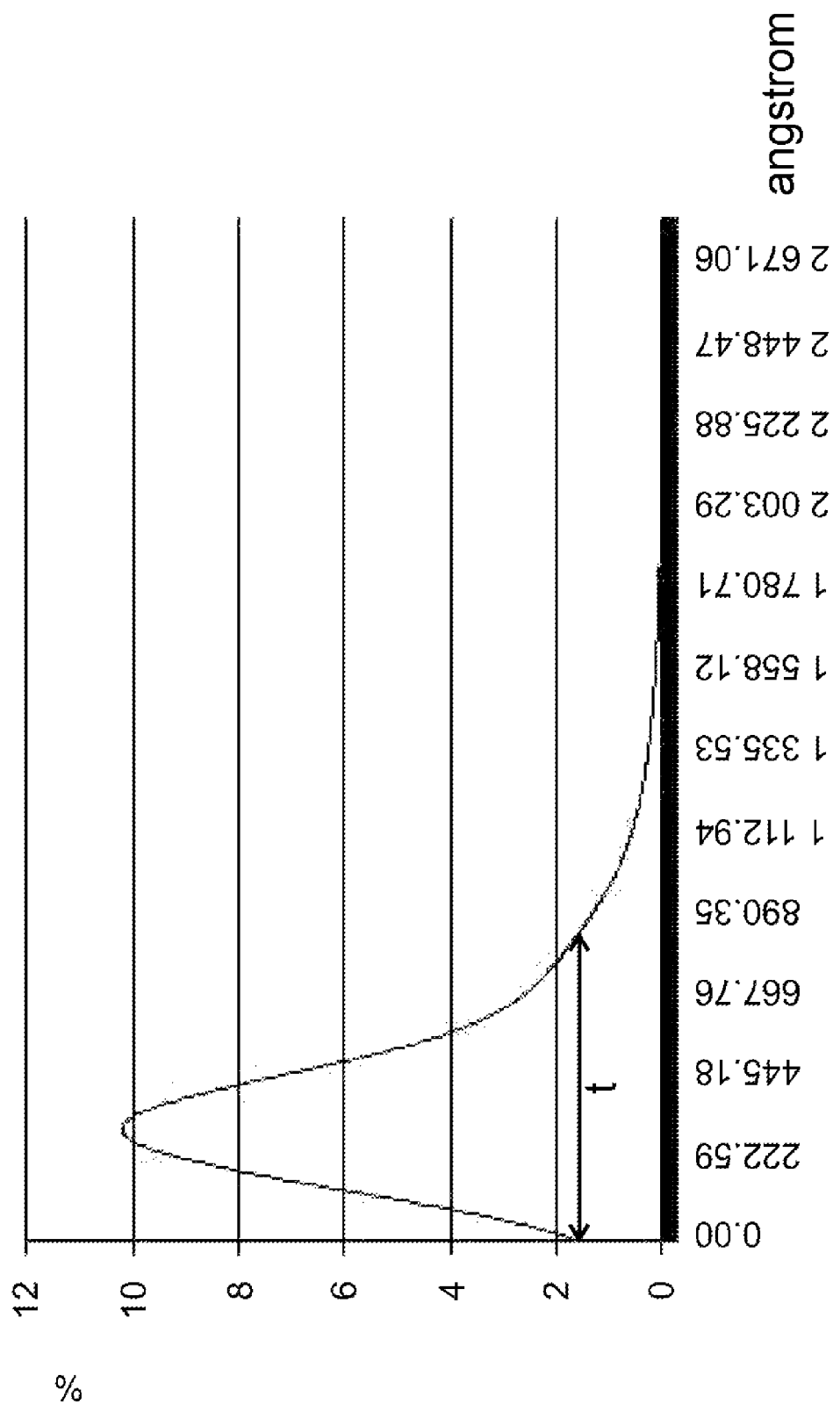

A study carried out on a simulator of the implantation of multicharged ions, relying on semiempirical data developed by the inventors, gives, under the abovementioned treatment conditions, the following results recorded in table 1 for helium (see the implantation profile of FIG. 2) and table 2 for argon (see the implantation profile of FIG. 3).

TABLE 1

| Dose ($10^{16}$ ions He/cm$^2$) | Antireflective effect observable | He atomic concentration (%) | Implanted layer thickness |
|---|---|---|---|
| 1 | No | 1% | 200 nm |
| 5 | No | 5% | 200 nm |
| 10 | Yes | 11% | 200 nm |

TABLE 2

| Dose ($10^{16}$ ions Ar/cm$^2$) | Antireflective effect observable | Ar atomic concentration (%) | Implanted thickness |
|---|---|---|---|
| 1 | No | 2.5% | 112 nm |
| 3 | Yes | 12.5% | 112 nm |
| 6 | No | 21% | 112 nm |

As is recommended by the process of the invention, the adjusting of the acceleration voltage of the ions is calculated so as to adjust the implanted thickness over a multiple of approximately 100 nm. These extrapolated values (acceleration voltage, dose) can be more finely adjusted during an experimental adjustment phase using precise interferometric means which make it possible to evaluate the optimum reduction in the reflection coefficient (see abovementioned method).

Figure 1B:
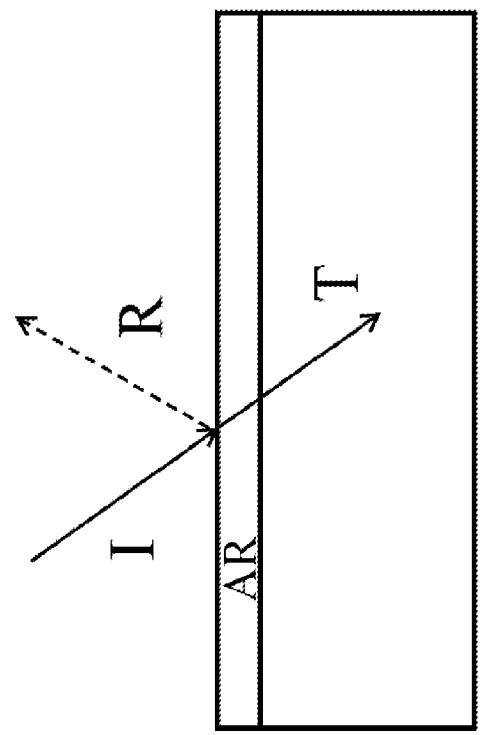
FIGS. 1.a and 1.b describe the propagation of an incident wave without and with an antireflective layer.
Figure 1A:
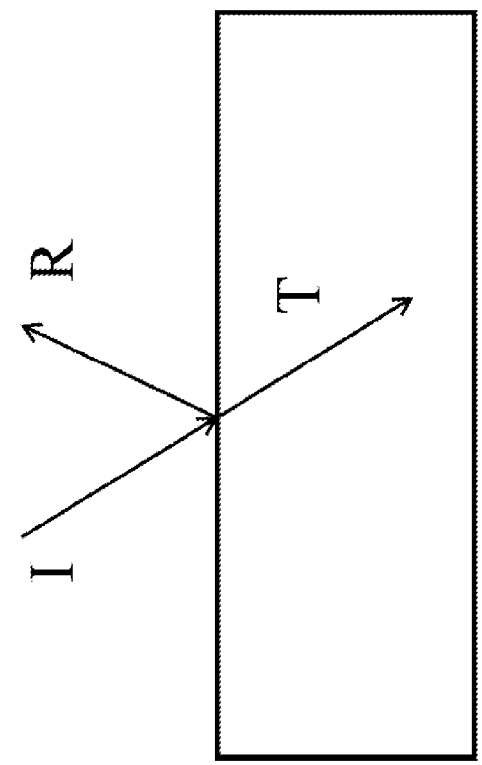

FIG. 1.a describes how an incident wave (I) is separated during passage through the diopter into a transmitted wave (T) and a strongly reflected wave (R), as a solid line. FIG. 1.b describes how an antireflective layer (AR) created by the process of the invention weakly returns the reflected wave (R), as a dotted line.

FIG. 2 represents the implantation profile of helium ions corresponding to a dose of $10^{17}$ ions/cm$^2$ obtained with a beam of He$^+$ and He$^{2+}$ ions and an acceleration voltage of 35 kV. The distribution of the He$^+$/He$^{2+}$ ions is 90%/10%. The implantation depth, expressed in angstroms, is found on the abscissa and the atomic concentration of implanted helium ions, expressed as %, is found on the ordinate. The atomic concentration of helium ions reaches approximately 10% (+/−5%) over an implanted thickness of approximately 200 nm (i.e., 2 times 100 nm). The implanted thickness corresponds to the region where the atomic concentration of implanted helium ions is greater than or equal to 1%. As is confirmed by the experiment, these characteristics confer antireflective properties on the implanted layer.

FIG. 3 represents the implantation profile of argon ions corresponding to a dose of 3*$10^{16}$ ions/cm$^2$ obtained with a beam of Ar$^+$, Ar$^{2+}$ and Ar$^{3+}$ ions and an acceleration voltage of 35 kV. The distribution of the Ar$^+$/Ar$^{2+}$/Ar$^{3+}$ ions is 60%/30%/10%. The implantation depth, expressed in angstroms, is found on the abscissa and the atomic concentration of implanted helium ions, expressed as %, is found on the ordinate. The atomic concentration of argon ions reaches approximately 10% (+/−5%) over an implanted thickness of approximately 100 nm (i.e., 1 times 100 nm). The implanted thickness t corresponds to the region where the atomic concentration of implanted helium ions is greater than or equal to 1%. As is confirmed by the experiment, these characteristics confer antireflective characteristics on the implanted layer.

Furthermore, a second series of tests was undertaken in order to evaluate the antireflective treatment with characterization means in order to quantify, with greater accuracy, the gain in transmission of the light G (as %) obtained after treatment through a diopter made of glass belonging to the soda-lime family. By definition, G refers to the gain, expressed as %, corresponding to the increase in the light transmission coefficient obtained after treatment (in other words, the difference between the transmission coefficient after and before treatment).

Two types of ions were employed: nitrogen (N$_2$) and argon (Ar).

For the nitrogen, two treatment depths were studied by adjusting the acceleration voltage to 20 and 35 kV.

For the argon, just one acceleration voltage of 35 kV was employed.

Several doses were employed for each type of ion at different acceleration voltages. The results are recorded in the following tables:

For nitrogen (N$_2$) at 20 kV:

| Doses ($10^{17}$ ions/cm$^2$) | Gain G (%) |
|---|---|
| 0 | 0 |
| 0.01 | 0.4 |
| 0.05 | 0.6 |
| 0.1 | 0.5 |
| 0.5 | 2.3 |
| 1 | 2.3 |

For nitrogen (N$_2$) at 35 kV:

| Doses ($10^{17}$ ions/cm$^2$) | Gain G (%) |
|---|---|
| 0 | 0 |
| 0.05 | 0.5 |
| 0.1 | 0.6 |
| 0.3 | 0.7 |
| 0.6 | 1.4 |
| 0.75 | 1.7 |
| 1 | −0.4 |
| 2.5 | 1.2 |
| 5 | 0.2 |

For argon (Ar) at 35 kV:

| Doses ($10^{17}$ ions/cm$^2$) | Gain G (%) |
|---|---|
| 0 | 0 |
| 0.75 | 1.9 |
| 1 | 2.1 |
| 2.5 | 2.4 |

Figure 4:
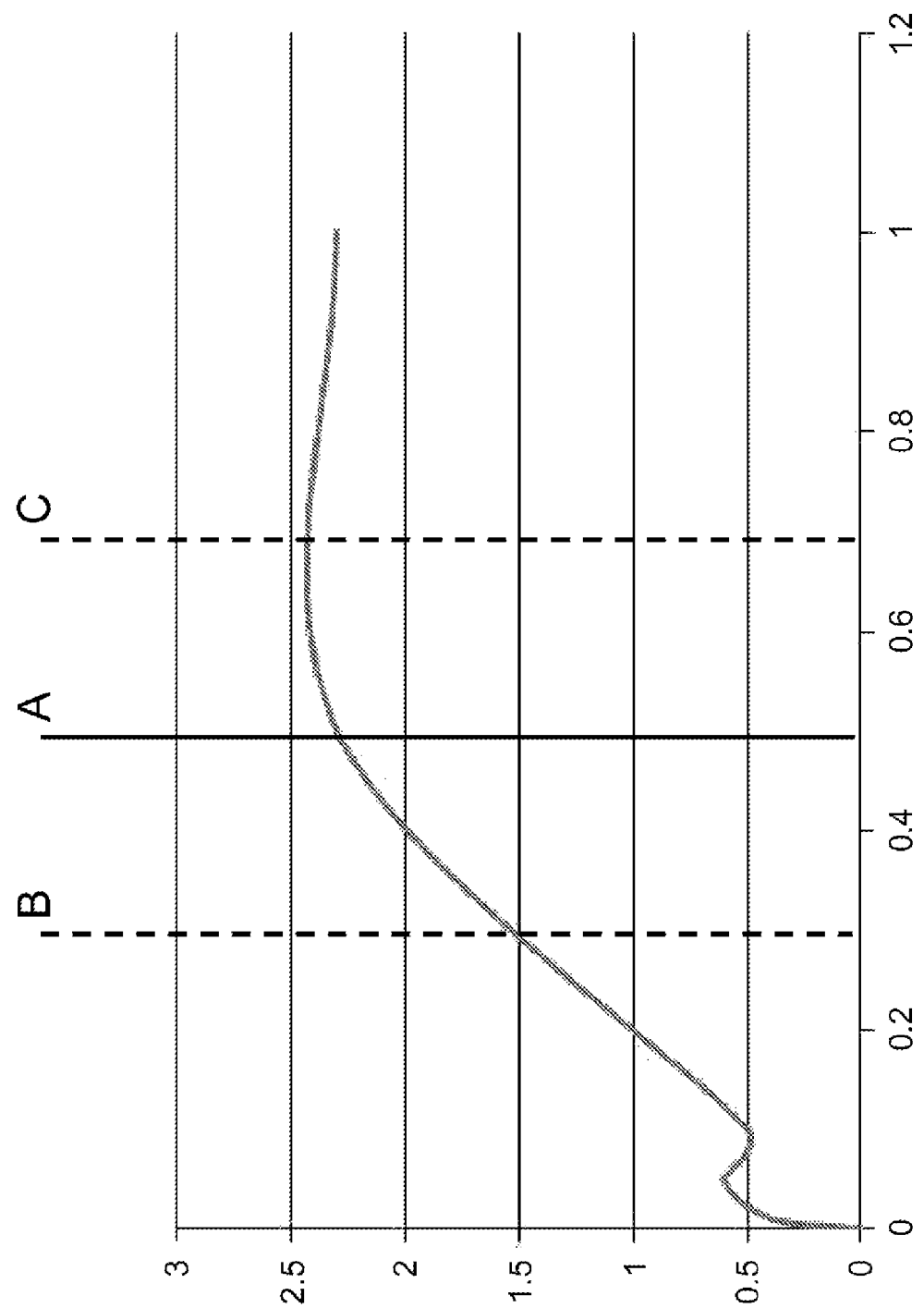
FIGS. 4, 6 and 8 represent the variation in the gain G (as %) measured after the treatment as a function of the dose of ions for a given acceleration voltage.

FIG. 4 represents, on the axis of the ordinates, the gain G (in %) measured after treatment with nitrogen (N$_2$) at 20 kV and according to different doses represented on the axis of the abscissa and expressed in $10^{17}$ ions/cm$^2$. A dose of 0.4×$10^{17}$ ions/cm$^2$ appears particularly indicated in order to reduce by half the light reflection coefficient, which changes from 4% to 2%, whereas the light transmission coefficient, which increases by 2%, changes from 96% to 98%. The line referenced A corresponds to the dose for which the atomic concentration of implanted ions is equal to 10% and the lines referenced B and C respectively correspond to the doses for which the atomic concentration of implanted ions is equal to 5% and 15%. The saturation threshold of the curve corresponding to a maximum gain in light transmission which is located on the line A. The lines B and C frame this threshold.

Figure 5:
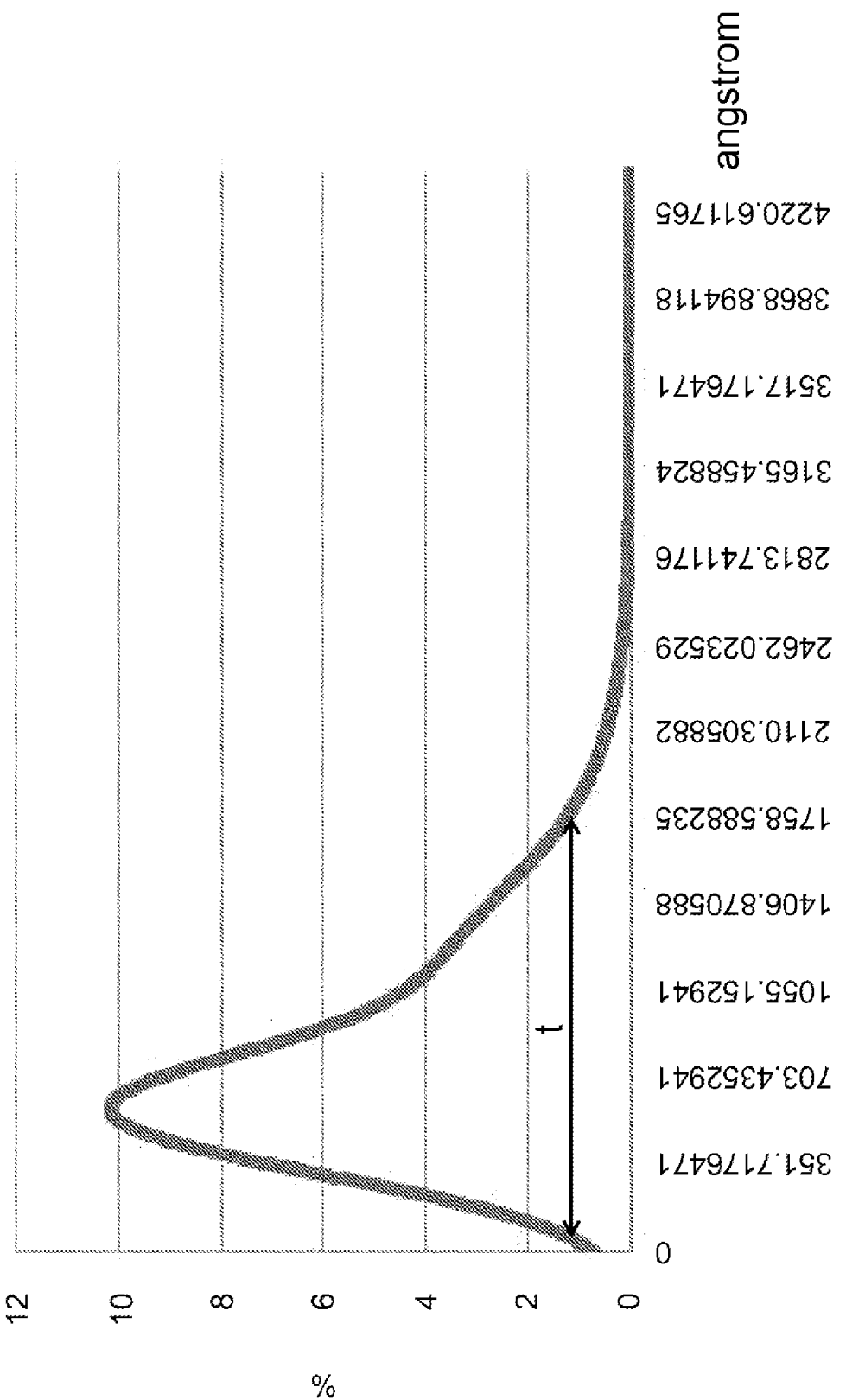

FIG. 5 represents the implantation profile simulated with nitrogen ions corresponding to a dose of $0.5*10^{17}$ ions/cm$^2$ obtained with a beam of $N^+$, $N^{2+}$ and $N^{3+}$ ions and an acceleration voltage of 20 kV. The distribution of the $N^+/N^{2+}/N^{3+}$ ions is estimated equal to 58%/31%/11%. The implantation depth, expressed in angstroms, is found on the abscissa and the atomic concentration of implanted nitrogen ions, expressed as %, is found on the ordinate. The atomic concentration of nitrogen ions reaches approximately 10% over an implanted thickness of approximately 200 nm (i.e., 2 times 100 nm). The implanted thickness t corresponds to the region where the atomic concentration of implanted nitrogen ions is greater than or equal to 1%. The experiment proves that these treatment characteristics in terms of maximum concentration of implanted ions and in terms of treatment depth confer antireflective characteristics on the layer implanted with nitrogen ions.

Figure 6:
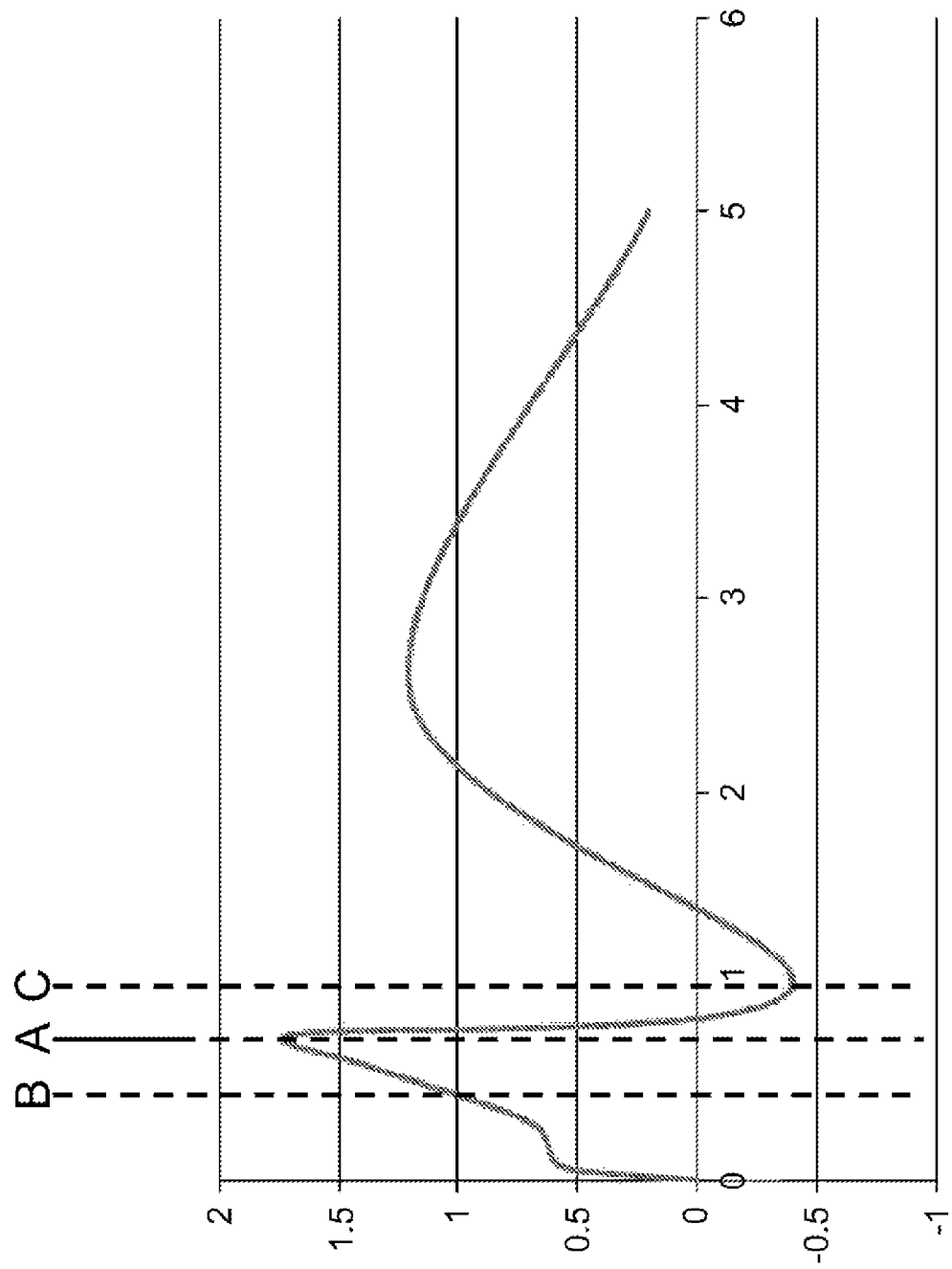

FIG. 6 represents, on the axis of the ordinates, the gain G (as %) measured after treatment with nitrogen ($N_2$) at 35 kV and according to different doses represented on the axis of the abscissa and expressed in $10^{17}$ ions/cm$^2$. Here also, a dose of $0.75\times10^{17}$ ions/cm$^2$ appears particularly indicated in order to reduce virtually by half the light reflection coefficient, which changes from 4% to 2.3%, whereas the light transmission coefficient, which increases by 1.7%, changes from 96% to 97.7%. The line referenced A corresponds to the dose for which the atomic concentration of implanted ions is equal to 10% and the lines referenced B and C respectively correspond to the doses for which the atomic concentration of implanted ions is equal to 5% and 15%. The peak of the curve corresponding to the maximum gain in light transmission is located on the line A. The lines B and C frame this peak.

Figure 7:
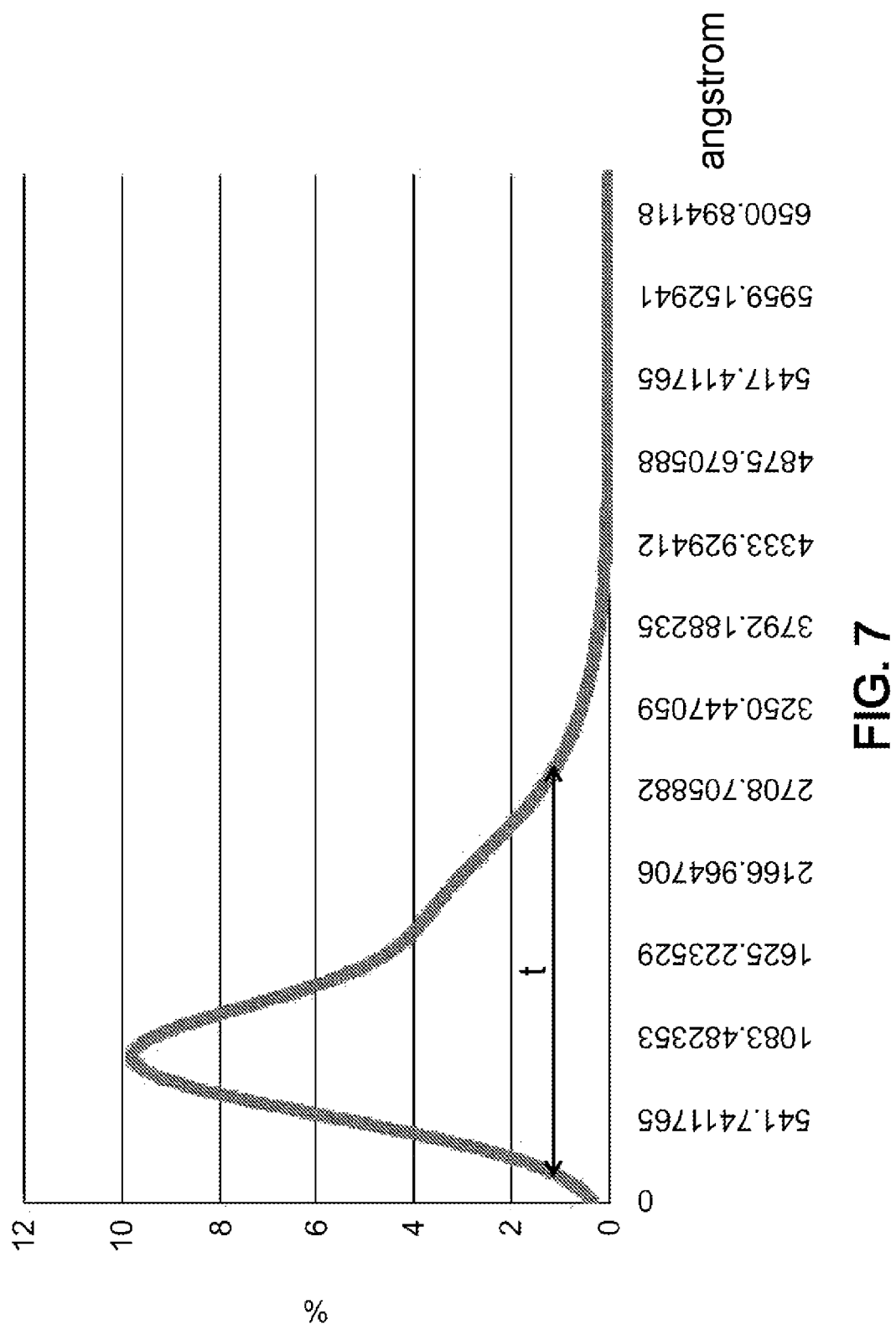

FIG. 7 represents the implantation profile simulated with nitrogen ions corresponding to a dose of $0.75*10^{17}$ ions/cm$^2$ obtained with a beam of $N^+$, $N^{2+}$ and $N^{3+}$ ions and an acceleration voltage of 35 kV. The distribution of the $N^+/N^{2+}/N^{3+}$ ions is estimated equal to 58%/31%/11%. The implantation depth, expressed in angstroms, is found on the abscissa and the atomic concentration of implanted nitrogen ions, expressed as %, is found on the ordinate. The atomic concentration of nitrogen ions reaches approximately 10% over an implanted thickness of approximately 300 nm (i.e., 3 times 100 nm). The implanted thickness t corresponds to the region where the atomic concentration of implanted nitrogen ions is greater than or equal to 1%. The experiment proves that these treatment characteristics in terms of maximum concentration of implanted ions and in terms of treatment depth confer antireflective characteristics on the layer implanted with nitrogen ions.

Figure 8:
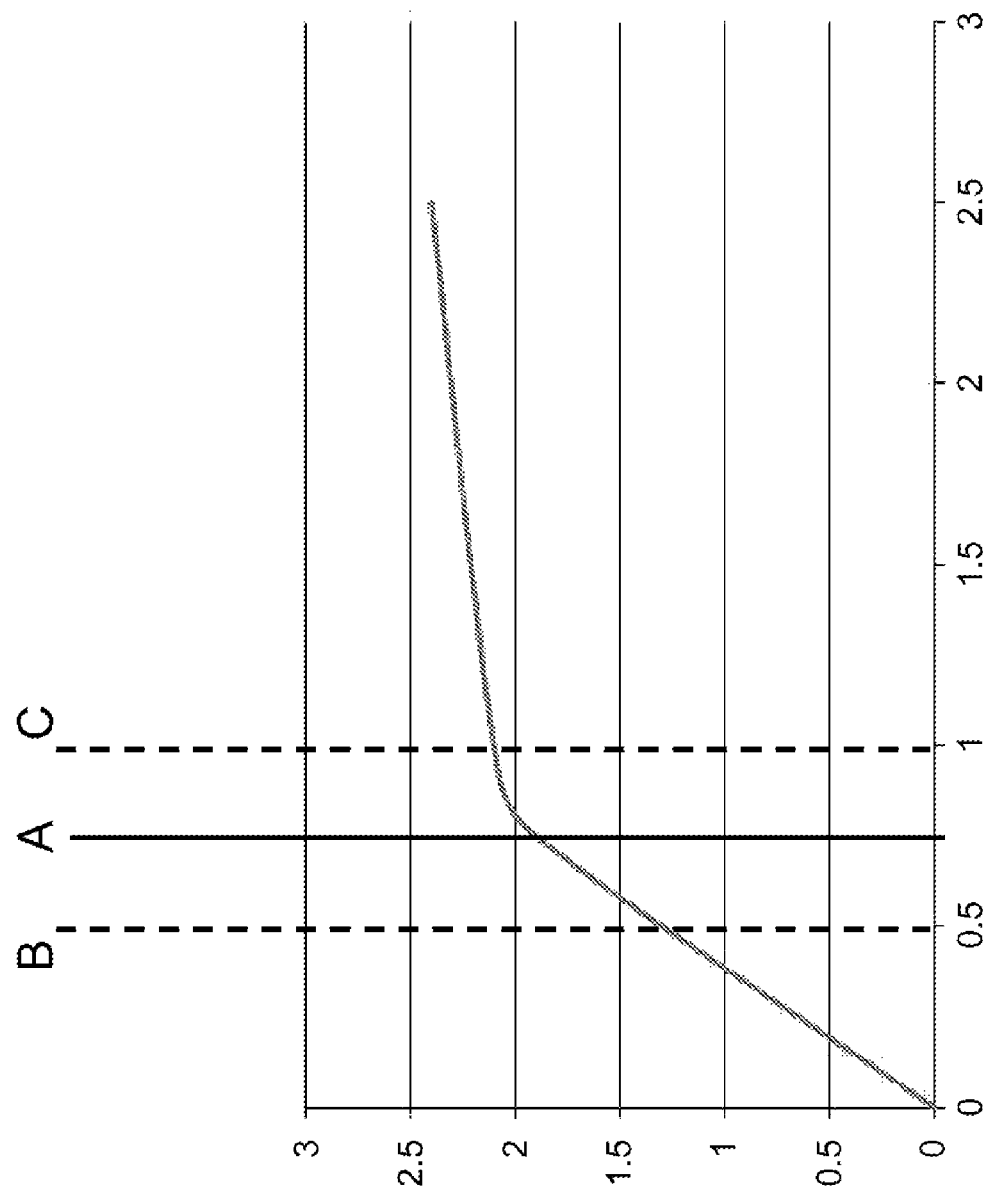

FIG. 8 represents, on the axis of the ordinates, the gain G (as %) measured after treatment with argon (Ar) at 35 kV and according to different doses represented on the axis of the abscissa and expressed in $10^{17}$ ions/cm$^2$. A dose of $0.75\times10^{17}$ ions/cm$^2$, indeed even less, appears particularly indicated in order to reduce virtually by half the light reflection coefficient, which changes from 4% to 2.1%, whereas the light transmission coefficient, which increases by 1.9%, changes from 96% to 97.9%. The line referenced A corresponds to the dose for which the atomic concentration of implanted ions is equal to 15% and the lines referenced B and C respectively correspond to the doses for which the atomic concentration of implanted ions is equal to 10% and 20%. The saturation threshold corresponding to a maximum gain in light transmission is located instead on a line A where the concentration is 15%, slightly greater than that expected at 10%. However, it will be pointed out that the curve is the product of an extrapolation with a finite number of results acquired with doses greater than or equal to $0.5\times10^{17}$ cm$^2$. It would be necessary to supplement and refine this extrapolation with results acquired with lower doses located below $0.75\times10^{17}$ ions/cm$^2$ (for example 0.1, 0.2 and $0.5\times10^{17}$ ions/cm$^2$). It is highly probable that, on this occasion, the saturation threshold is carried over into a region of lower doses located approximately around $0.5\times10^{17}$ ions/cm$^2$ corresponding to an atomic concentration of implanted ions located around 10%, which would be more in accordance with the predictions.

FIG. 9 represents the implantation profile simulated with argon ions corresponding to a dose of $0.75*10^{17}$ ions/cm$^2$ obtained with a beam of $Ar^+$, $Ar^{2+}$ and $Ar^{3+}$ ions and an acceleration voltage of 35 kV. The distribution of the $Ar^+/Ar^{2+}/Ar^{3+}$ ions is estimated equal to 66%/24%/10%. The implantation depth, expressed in angstroms, is found on the abscissa and the atomic concentration of implanted argon ions, expressed as %, is found on the ordinate. The atomic concentration of argon ions reaches approximately 15% over an implanted thickness of approximately 100 nm (i.e., 1 times 100 nm). The implanted thickness t corresponds to the region where the atomic concentration of implanted nitrogen ions is greater than or equal to 1%. The experiment proves that these treatment characteristics in terms of maximum atomic concentration of implanted ions and in terms of treatment depth confer antireflective characteristics on the layer implanted with argon ions.

From this treatment campaign, it emerges that nitrogen makes it possible to obtain antireflective properties comparable to those obtained with noble ions, such as helium or argon. Without going too far, this might possibly be explained, as for the noble gases, by the formation of nanocavities filled with nitrogen $N_2$ molecules. Preliminary studies show that the same effects are obtained with another diatomic gas, such as oxygen ($O_2$).

The invention claimed is:
1. A process for imparting to a glass material a durable antireflective treatment that is antireflective to an incident wave having a wavelength in a visible region of a spectrum, comprising:
  subjecting the glass material to a bombardment by an ion beam of mono- and multicharged ions of a gas which are produced by an electron cyclotron resonance (ECR) source to form an implanted layer of ions in the glass material, wherein:
    a temperature for treatment of the glass material during the bombardment is less than or equal to a glass transition temperature of the glass material;
    the bombardment delivers to the glass material a dose of mono- and multicharged ions of the gas as measured per unit of surface area within a range of between $10^{12}$ ions/cm$^2$ and $10^{18}$ ions/cm$^2$, wherein the dose is selected to obtain an atomic concentration of mono- and multicharged ions of the gas such that the refractive index n of the implanted layer is approximately equal to $(n1*n2)^{1/2}$, where n1 is the index of the air and n2 is the index of the glass;
    an acceleration voltage of the ion beam is within a range of between 5 kV and 1000 kV and is selected to obtain an implanted thickness t equal to p*100 nm, where t is the implanted thickness corresponding to a region of implantation where the atomic concen- tration of implanted mono- and multicharged ions of the gas is greater than or equal to 1%, and p is an integer.

2. The process as claimed in claim 1, wherein the mono- and multicharged ions of the gas of the ion beam are ions of the elements selected from the group consisting of helium (He), neon (Ne), argon (Ar), krypton (Kr) and xenon (Xe).

3. The process as claimed in claim 1, wherein the gas is selected from the group consisting of nitrogen ($N_2$) and oxygen ($O_2$).

4. The process as claimed in claim 1, wherein the ion beam of mono- and multicharged ions of the gas comprises at least 10% of multicharged ions.

5. The process as claimed in claim 1, wherein the dose of implanted mono- and multicharged ions of the gas per unit of surface area is selected to achieve an atomic concentration of implanted ions equal to 10% with an uncertainty of (+/−) 5%.

6. The process as claimed in claim 5, wherein the dose of implanted mono- and multicharged ions of the gas per unit of surface area and the acceleration voltage are selected prior to subjecting the glass material to the bombardment to provide an atomic concentration of implanted ions equal to 10% with an uncertainty of (+/−) 5% starting from an implantation profile of the mono- and multicharged ions of the ion beam as a function of a depth of the implanted layer.

7. The process as claimed in claim 1, wherein the glass material is movable with respect to the ion beam of mono- and multicharged ions of the gas at a rate, $V_D$, of between 0.1 mm/s and 1000 mm/s.

8. The process as claimed in claim 7, wherein one and the same region of the glass material is moved under the beam of mono- and multicharged ions of the gas according to a plurality, N, of passes at the rate $V_D$.

9. The process as claimed in claim 1, wherein the glass material is a soda-lime glass.

10. A glass part comprising at least one surface with an implanted ion layer formed by the process as claimed in claim 1, wherein the reflection of an incident wave in the visible region is reduced to less than half.

11. The process as claimed in claim 1, wherein the glass material is a bulk glass part selected from the group consisting of a touch screen, a spectacle lens, a lens of an optical device, a window of a building and an optical fiber.

\* \* \* \* \*